Dec. 22, 1959  A. M. LIPPISCH  2,918,232
TWIN SHROUD AERODYNE
Filed Sept. 24, 1956
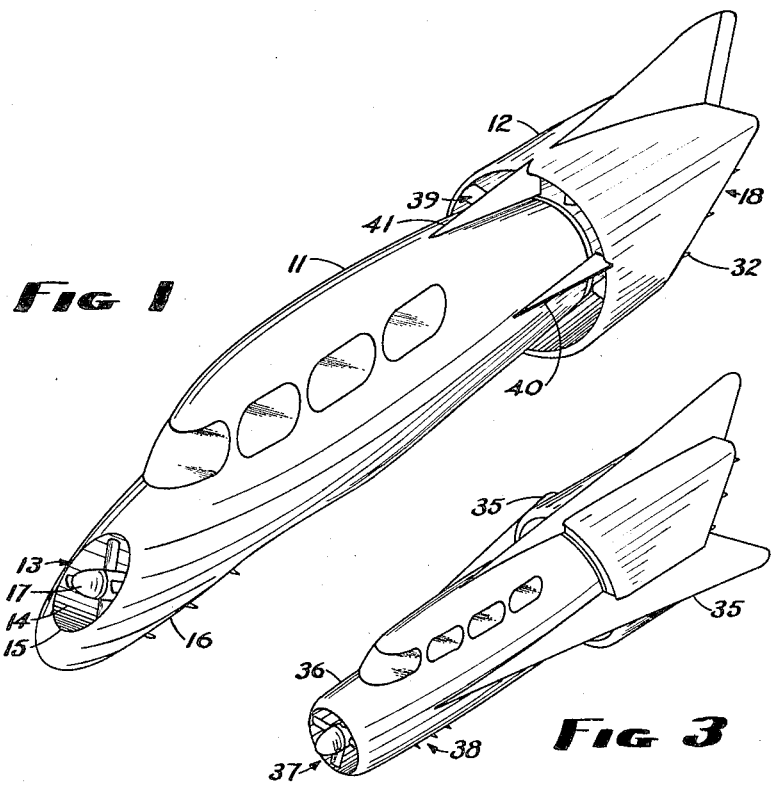
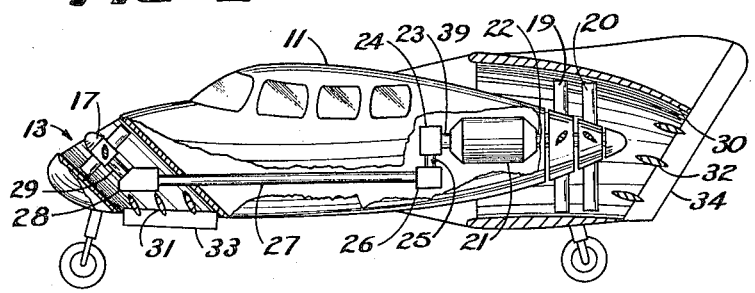
INVENTOR.
ALEXANDER M. LIPPISCH
BY
ATTORNEY

United States Patent Office 2,918,232
Patented Dec. 22, 1959

2,918,232
TWIN SHROUD AERODYNE

Alexander M. Lippisch, Cedar Rapids, Iowa, assignor to Collins Radio Company, Cedar Rapids, Iowa, a corporation of Iowa Application September 24, 1956, Serial No. 612,912

1 Claim. (Cl. 244—23)

This invention pertains to wingless aircraft or aerodynes having air ducts, and particularly to aircraft having main rear air ducts and inclined auxiliary front air ducts.

Aircraft of this invention are designed to operate efficiently in service for which long runways are not available.

The air flow systems utilized in aircraft of this invention enable the craft to land in a minimum amount of space. The direction of air flow can be directed as required to cause the aircraft to hover, or to fly either vertically or horizontally. Previously, helicopters with large horizontal propellers have been used to obtain hovering and vertical flight. Advantages to be obtained by using aircraft with air ducts have been described in a co-pending U.S. patent application, "Ducted Propeller Aircraft" filed by A. M. Lippisch. Aircraft using air ducts are capable of higher speeds and greater efficiency than are obtained by conventional helicopters.

In the aircraft of this invention, air ducts have been arranged for obtaining high efficiency and high forward speed. A large rear air duct provides most of the required thrust for propelling the aircraft forward. This duct and a smaller frontal air duct provide required lifting force at points oppositely positioned with respect to the center of gravity. The rear air duct has been arranged to remove the boundary layer of air floating along the surface of the aircraft, thereby to increase the efficiency of the aircraft.

An object of the present invention is to provide an arrangement of air ducts in wingless aircraft for reducing drag caused by retarded layer of air along surfaces of aircraft.

Another object is to provide an arrangement of air ducts that contribute to good stability.

And still another object is to provide aircraft of simple construction that can take off and land in a minimum of space.

These objects and the appended claim can be better understood by reading the description with reference to the accompanying single sheet of drawings, in which:

Figure 1 shows in perspective a front oblique view of the aerodyne of the present invention;

Figure 2 shows a side view of the aerodyne shown in Figure 1 with portions of the fuselage cut away for showing the air flow system with its air propelling means; and Figure 3 shows a modification of the aircraft of this invention in which small fins extend along the body of the aircraft.

The aircraft of Figure 1 includes an elongated fuselage 11 to the rear of which is attached a large air duct 12. At the front of the aircraft is located a smaller air flow system 13 for directing air downwardly and rearwardly. Space for cargo and fuel is provided between the two air flow systems.

The front air flow system 13 consists of air duct 14 extending from a circular opening 15 which faces upwardly and forwardly in the front of the fuselage to an opening 16 in the bottom of the fuselage. The upward, forward portion of the opening, which is cylindrical, contains propeller 17. Preferably, the bottom opening 16 is substantially rectangular in order to provide convenient mounting positions for deflecting vanes. The walls near the bottom of the duct may be formed so that the cross-sectional area of the duct is gradually changed from cylindrical to rectangular.

The front portion of rear air duct 12 encompasses the tapering tail section of fuselage 11. The tail section becomes gradually smaller toward the rear and supports hubs for counter-rotating propellers that are centered within the rear air duct. The rear air duct is secured concentrically with respect to the fuselage by fins, for example, fins 40 and 41, disposed longitudinally along the surface of the fuselage on vertical and horizontal radii. The rear opening 18 of the air duct is preferably substantially rectangular and faces rearwardly and slightly downwardly.

Most of the thrust for propelling the aircraft forward is obtained by propelling air from over the fuselage through intake opening 39 of the rear duct 12 and expelling it out of the rear exhaust opening 18. An upward force is applied to the rear portions of the aircraft by suction forces at the intake of the rear air duct 12. Since the center of gravity of the aircraft is in front of air intake 39 of air duct 12, the front air system 13 is provided in order to balance out a pitch-down tendency of the nose of the aircraft. The air flow from the front air duct is directed nearly vertically downwardly primarily to provide lift for the nose of the aircraft.

The control surfaces of the aircraft and the power system are shown in Figure 2. The main fuselage 11 of the aircraft decreases in cross-sectional area toward the rear of the aircraft to form a hub for counter-rotating propellers 19 and 20. In front of the propellers is mounted engine 21 that has a main drive shaft 22 extending to the rear for coupling to propellers 19 and 20, and a secondary drive shaft 23 extending toward the front for operating auxiliary propeller 17 that is within the front air flow system 13. Preferably, for reliable operation, the source of power 21 is a plurality of engines. The engines may be arranged so that any one of them may be uncoupled from the drive shaft and repaired while in flight. Power for operating auxiliary propeller 17 is transmitted from engine 21 through drive shaft 23 and gear system 24 to vertical shaft 25 to miter gear system 26. Through the use of the vertical shaft, the power is transmitted downwardly so that horizontal shaft 27 is located near the bottom of the aircraft so as not to interfere with convenient placement of cargo and passenger space. Power from miter gear 26 is applied forward through horizontal drive shaft 27 and through gear system 28 to propeller drive shaft 29 that is slanted upwardly for driving auxiliary propeller 17.

In order to direct the main air stream for developing required lift when the aircraft is in usual forward flight, the main air duct 12 has an upper inside surface 30 that is curved slightly downwardly toward the rear. When the aircraft is to ascend or descend vertically, both the auxiliary air stream and the main air stream are directed vertically downwardly for obtaining lift. The air streams are directed downwardly by positioning deflecting vanes that are in the exhaust openings of the air flow systems.

Controllable air surfaces are disposed within the opening of both front and rear air ducts for controlling the attitude of the aircraft. The mode of flight is primarily determined by positioning deflecting vanes within the openings. A plurality of evenly-spaced adjustable vanes 31 are rotatably mounted laterally across exhaust opening 16 of front air duct 13. Similarly, evenly-spaced deflecting vanes 32 are horizontally disposed across exhaust opening 18 of rear air duct 12. These deflecting vanes are connected to conventional type aircraft controls for positioning them as required. The position of the vanes and the ratio of the thrust between the front propeller 17 and the rear propellers 19 and 20 determine the relative lift applied to each end of the aircraft. The thrust of the propellers is changed by varying the pitch of the blades by usual control means. The pitch of the aircraft is determined by the pitch of the propellers and the position of the deflecting vanes. Yaw control is obtained by a roll flap at the exhaust opening of the first air duct and by a rudder at the opening of the rear air duct. Roll flap 33 is mounted to the center of front exhaust opening 16 perpendicular to control vanes 31. The flap is controlled in the usual manner for directing air flow to either side as required. Rudder 34 is mounted perpendicular to control vanes 32 across opening 18 of rear air duct 12.

In Figure 3 is shown a modification in which small fins 35 have been mounted along the sides of fuselage 36. Also, as shown in Figure 3, the intake opening 37 of the front air duct may face substantially forward. The air duct would then need to be curved sufficiently so that its bottom exhaust opening 38 faces downwardly and rearwardly as described above for Figure 1. It is to be understood that aircraft of this invention is usually equipped with conventional landing gear.

During take-off, front deflecting vanes 31 and rear deflecting vanes 32 are positioned for directing air streams straight downwardly. The attitude of the aircraft is stabilized by controlling the pitch of front propeller 17 and rear propellers 19 and 20. Roll flap 33 and rudder 34 are also used in stabilizing the aircraft. Since these control surfaces are positioned directly in the air streams which are expelled from the air ducts, change in their positions is very effective in changing the attitude of the aircraft. After the aircraft has risen vertically to the desired altitude, deflecting vanes 31 and 32 are turned for directing the air rearwardly and the pitch of the propellers is changed as required for maintaining desired attitude. Through properly positioning the deflecting vanes, the aircraft may be controlled for continuing to gain altitude during forward flight; or after desired altitude has been reached, the vanes may be adjusted for horizontal flight. During flight, the roll flap 33, rudder 34, and deflecting vanes 31 and 32 may be controlled automatically to maintain the aircraft on its course. When the aircraft is to be landed, deflecting vanes 31 and 32 are again turned for directing the air streams downwardly. The speed of the engines and the pitch of the propellers are adjusted for allowing the aircraft to descend vertically at a desired rate.

Aircraft designed according to this invention are simple in construction, economical, and have stable flight characteristics. Efficiency of the aircraft is improved by using shrouded propellers for obtaining increased thrust, by having a small frontal profile, and by having means for reducing the retarded boundary layer of air that floats along the surface of aircraft. Since the opening for the rear air duct surrounds the fuselage, the boundary layer of air is drawn into the air duct and accelerator to produce thrust. This arrangement of the rear air duct and the absence of wings greatly reduces the wake behind this type of aircraft so that drag is small. The aerodyne is easily controlled in that the direct flow of air is channeled over the control surfaces. Through adjustment of the vanes and adjustment of the pitch of the propellers, required lift is obtained at opposite points from the center of gravity of the aircraft.

While the air flow systems of this invention have been described with respect to particular embodiments, it is to be understood that modifications may be made thereto for adapting aircraft to various types of service and still be within the spirit and scope of the invention according to the following claim.

What is claimed is:

A wingless aircraft having an elongated streamlined fuselage that has a forward nose and a tapering aft part, said aft part tapering inwardly toward the rear, a main air duct and an auxiliary air duct for directing streams of air to sustain said aircraft in flight with its longitudinal axis substantially horizontal, the walls of said main air duct encircling said aft part and being spaced from said aft part to form a main inlet facing forward at the front of said main air duct, said main air duct extending rearwardly beyond said fuselage to a rear outlet, the walls of said main air duct being gradually curved slightly downwardly toward the rear for directing a stream of air rearwardly and downwardly, a plurality of first lateral air-deflecting vanes and a rudder perpendicular thereto rotatably mounted across said rear outlet, said auxiliary air duct being disposed slantingly downwardly fore to aft through the nose of said fuselage such that said auxiliary air duct has an auxiliary inlet facing forward and upwardly at the front of said fuselage and an auxiliary outlet facing downwardly, said auxiliary air duct having substantially less lateral cross-sectional area than said main air duct, a plurality of second lateral air-deflecting vanes and a longitudinal rudder rotatably mounted across said auxiliary outlet, and air-propelling means in each of said air ducts for propelling air rearwardly and downwardly.

References Cited in the file of this patent

UNITED STATES PATENTS

| 1,876,682 | Janney | Sept. 13, 1932 |
| 2,759,686 | Griffith | Aug. 21, 1956 |

FOREIGN PATENTS

| 652,942 | Great Britain | May 2, 1951 |
| 745,344 | Great Britain | Feb. 22, 1956 |